(12) United States Patent  (10) Patent No.: US 7,511,879 B2
Kinoshita  (45) Date of Patent: Mar. 31, 2009

(54) LIGHT SOURCE DEVICE AND PROJECTOR

(75) Inventor: Satoshi Kinoshita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/136,394

(22) Filed: Jun. 10, 2008

(65) Prior Publication Data
US 2008/0310010 A1    Dec. 18, 2008

(30) Foreign Application Priority Data
Jun. 12, 2007    (JP)    ............................. 2007-155317

(51) Int. Cl.
  *G02F 2/02*    (2006.01)
  *H01S 3/10*    (2006.01)
(52) U.S. Cl. ...................... 359/326; 359/328; 372/22; 363/54
(58) Field of Classification Search ......... 359/326–332; 372/21–22, 35; 353/52, 54
See application file for complete search history.

(56) References Cited
U.S. PATENT DOCUMENTS
5,898,718 A * 4/1999 Mohatt et al. ................. 372/22

2008/0174738 A1 * 7/2008 Takeda ......................... 353/28
2008/0175286 A1 * 7/2008 Kamijima ..................... 372/30

FOREIGN PATENT DOCUMENTS
JP    A-05-100267    4/1993
JP    A-2006-352009  12/2006

* cited by examiner

*Primary Examiner*—Hemang Sanghavi
(74) *Attorney, Agent, or Firm*—Oliff & Berridge, PLC

(57) ABSTRACT

A light source device includes a light source having a plurality of light emitting sections, a plurality of wavelength conversion elements each having a periodic polarization inversion structure, and for converting wavelengths of light beams emitted from the plurality of light emitting sections into predetermined wavelengths, a temperature control medium for controlling temperature of the plurality of wavelength conversion elements, a holding member having a housing space for housing the temperature control medium, and for holding the plurality of wavelength conversion elements, and a temperature control section for controlling the temperature of the plurality of wavelength conversion elements with the temperature control medium, and the temperature control section controls the temperature of the wavelength conversion elements so that the wavelength of the light beam emitted from at least one of the plurality of wavelength conversion elements is different from the wavelength of the light beam emitted from another of the plurality of wavelength conversion elements.

15 Claims, 8 Drawing Sheets

LIGHT SOURCE DEVICE AND PROJECTOR

BACKGROUND

1. Technical Field

The present invention relates to a light source device and a projector.

2. Related Art

In recent years, while demands for downsizing of projectors are growing, in accordance with increase in output power of semiconductor lasers and appearance of blue semiconductor lasers, projectors using laser beam sources have been developed. The projectors of this kind are capable of having a sufficiently large color reproduction range because the wavelength band of the light source is narrow, and of downsizing and reducing the components, and consequently, have a great potential as display devices of the next generation. In this case, laser beam sources of the three colors, red (R), green (G), and blue (B) are required as the light source. Since, for example, the fundamental vibrations for the R-light source and the B-light source can be obtained by semiconductor lasers while the fundamental vibration for the G-light source cannot be obtained by a semiconductor laser, use of second harmonic generation (hereinafter abbreviated as SHG), the technology of generating a second harmonic wave by making an infrared beam from an infrared laser enter a nonlinear optical element, has been considered.

In the wavelength conversion of light using the nonlinear optical effect, it is required that the phase matching condition is fulfilled between the fundamental wave before the conversion and the harmonic wave after the conversion, and consequently, a quasi-phase matching method for periodically inverting the polarization direction in the crystal is used therefor. In general, a structure (hereinafter referred to as a periodic polarization inversion structure in the present specification) having the polarization direction periodically inverted with a fine pitch is formed in the crystal of $MgO:LiNbO_3$ to form a wavelength conversion element. However, the actual wavelength conversion element has an extremely narrow allowable range of wavelength satisfying the phase matching condition, and the output (conversion efficiency) is significantly lowered when the wavelength of the fundamental wave is shifted, if only a little. On the other hand, it is known that the conversion efficiency strongly depends on the temperature of the wavelength conversion element. There has been proposed a laser beam source device, which uses this dependency, has a plurality of wavelength conversion elements for executing wavelength conversion on a plurality of laser beams, and individually controls the temperature of each of the wavelength conversion elements, thereby keeping the conversion efficiency of the overall wavelength conversion elements (see e.g., JP-A-2006-352009 (Document 1)).

Further, there has been proposed a configuration for controlling the temperature of a nonlinear optical crystal by applying flow of a liquid or a gas around the nonlinear optical crystal (see e.g., JP-A-5-100267 (Document 2)). In an optical harmonic wave generation device described in the Document 2, two or more nonlinear optical crystals are arranged in series in the proceeding direction of the light, and the second harmonic generation is obtained by a laser beam sequentially passing through the nonlinear optical crystals. In the optical harmonic wave generation device, an inflow section and an outflow section of a medium are disposed in the vicinity of the nonlinear optical crystal disposed at the center of the three nonlinear optical crystals, and the medium flow is applied in a direction perpendicular to the arranging direction of the plural nonlinear optical crystals, thereby making the temperature of the nonlinear optical crystals constant.

In the past, ordinary projectors have often used a discharge lamp such as a super high-pressure mercury lamp as a light source. However, the discharge lamp of this kind has had problems of a relatively short life, a difficulty in quick lighting, a small color reproduction range, and so on. In contrast, according to the projector using the laser beam source described in the Document 1 or 2 above, the problems described above can be solved. However, in the technology described in the Document 1 or the Document 2, the projection light on the screen by the laser beam source has the phases of the light beams aligned with each other in the adjacent areas, and consequently has extremely high coherency. Since the coherent length of a laser beam extends to several tens meters in some cases, if two or more laser beams are combined, the beams combined through the light paths having a shorter difference than the coherent length inevitably cause strong interference. Therefore, a sharper scintillation (interference pattern) than that of a super high-pressure mercury lamp appears to cause significant degradation in display quality.

Further, in the configuration of cooling two or more nonlinear optical crystals described in the Document 2, there is a possibility that the flow of the medium in the vicinity of the nonlinear optical crystal disposed on an end portion of the two or more nonlinear optical crystals might be blocked, and therefore it is difficult to keep the two or more nonlinear optical crystals at predetermined temperature. As a result, the conversion efficiency of light in the nonlinear optical crystals is problematically lowered.

SUMMARY

In view of the above problems, the invention has an advantage of providing a light source device capable of performing temperature control of a wavelength conversion element and of emitting light with low coherency with high efficiency and a projector equipped with the light source device.

In order for obtaining the above advantage, the invention provides the following measures.

A light source device according to an aspect of the invention includes a light source having a plurality of light emitting sections, a plurality of wavelength conversion elements each having a periodic polarization inversion structure, and for converting wavelengths of light beams emitted from the plurality of light emitting sections into predetermined wavelengths, a temperature control medium for controlling temperature of the plurality of wavelength conversion elements, a holding member having a housing space for housing the temperature control medium, and for holding the plurality of wavelength conversion elements, and a temperature control section for controlling the temperature of the plurality of wavelength conversion elements with the temperature control medium, and the temperature control section controls the temperature of the wavelength conversion elements so that the wavelength of the light beam emitted from at least one of the plurality of wavelength conversion elements is different from the wavelength of the light beam emitted from another of the plurality of wavelength conversion elements.

In the light source device according to an aspect of the invention, the light beam emitted from at least one or more of the light emitting sections out of the plurality of light emitting sections of the light source enters one of the plurality of wavelength conversion elements. Then, the light beam is converted into a light beam with a predetermined wavelength in the plurality of wavelength conversion elements the temperature of which is controlled by the temperature control section, and is then emitted therefrom.

On this occasion, the temperature control section controls the temperature of the plurality of wavelength conversion elements with the temperature control medium so that the wavelength of the light beam emitted form at least one of the plurality of wavelength conversion elements is different from the wavelength of the light beam emitted form another of the plurality of wavelength conversion elements. Therefore, it becomes possible to reduce the coherency of the light beams emitted from the different wavelength conversion elements, thus reducing generation of the speckle noise.

Further, in the light source device according to this aspect of the invention, it is preferable that a pitch of the periodic polarization inversion structure of at least one of the plurality of wavelength conversion elements is different from a pitch of the periodic polarization inversion structure of another of the plurality of wavelength conversion elements, and the temperature control section controls the temperature of the plurality of wavelength conversion elements to be substantially the same.

In the light source device according to this aspect of the invention, the pitch of the periodic polarization inversion structure in the manufacturing process of at least one of the plurality of wavelength conversion elements is different from the pitch of the periodic polarization inversion structure in the manufacturing process of another of the plurality of wavelength conversion elements. Thus, by the temperature control section controlling the temperature of the plurality of wavelength conversion elements to be equal to each other, the wavelength of the light beam emitted from at least one of the wavelength conversion elements becomes different from the wavelength of the light beam emitted from another of the wavelength conversion elements. Thus, it becomes possible to reduce the coherency of the light beams emitted from the wavelength conversion elements.

Further, in the light source device according to this aspect of the invention, it is preferable that pitches of the periodic polarization inversion structures of the plurality of wavelength conversion elements are substantially equal to each other, and the temperature control section controls the temperature of the wavelength conversion elements so that the temperature of at least one of the plurality of wavelength conversion elements is different from the temperature of another of the plurality of wavelength conversion elements.

In the light source device according to this aspect of the invention, even if the pitches of the periodic polarization inversion structures in the manufacturing process of the plurality of wavelength conversion elements are equal to each other, the temperature of at least one of the plurality of wavelength conversion elements is controlled by the temperature control section so as to be different from the temperature of another of the plurality of wavelength conversion elements. Thus, the thermal expansion is caused in the wavelength conversion element by the variation of the temperature to cause the variation in the pitch, and consequently, the wavelengths of the light beams emitted from the wavelength conversion elements become different from each other. Therefore, it becomes possible to reduce the coherency of the light beams emitted from the wavelength conversion elements.

Further, since it is sufficient to manufacture the wavelength conversion elements with the pitches of the periodic polarization inversion structures equal to each other, the manufacturing cost can be suppressed.

Further, in the light source device according to this aspect of the invention, it is preferable that a circulating channel for circulating the temperature control medium in the housing space is disposed outside the holding member, and the temperature control medium flows along an arranging direction of the plurality of wavelength conversion elements.

In the light source device according to this aspect of the invention, since the circulating channel for circulating the temperature control medium is disposed outside the holding member, it becomes possible to efficiently circulate the temperature control medium in the housing space. Further, since the temperature control medium is made flow along the arranging direction of the plurality of wavelength conversion elements, it becomes possible that the temperature control medium has contact with the plurality of wavelength conversion elements while flowing therethrough. Thus, it becomes easy to control the temperature of the plurality of wavelength conversion elements.

Further, since the temperature control medium is made flow along the arranging direction of the plurality of wavelength conversion elements, even when the incident light beam is shifted in a plane perpendicular to the proceeding direction of the light beam within a certain wavelength conversion element, since the temperature gradient in the plane perpendicular thereto in the wavelength conversion element is small, the conversion efficiency of the light beam can be improved.

In the light source device according to this aspect of the invention, it is preferable that an inflow section allowing the temperature control medium to flow into the housing space and an outflow section allowing the temperature control medium to flow out from the housing space are provided to one end section of the holding member in the arranging direction of the plurality of wavelength conversion elements, and the inflow section and the outflow section are communicated to each other with the circulating channel.

In the light source device according to this aspect of the invention, the inflow section allowing the temperature control medium to flow into the housing space and the outflow section allowing the temperature control medium to flow out from the housing space are provided to one end section of the holding member in the arranging direction of the plurality of wavelength conversion elements, and the circulating channel is disposed outside the holding member. Thus, it becomes easy to convect the temperature control medium, which flow in from the inflow section, in the housing space. In other wards, since the temperature control medium is agitated inside the housing space from the inflow section towards the outflow section, it becomes easy to control the temperature of the plurality of wavelength conversion elements to be equal to each other.

Further, in the case in which the inflow section is disposed on one end section of the holding member in the arranging direction of the plurality of wavelength conversion elements, and the outflow section is disposed on other portions than the section of the holding member on which the inflow section is disposed, for example, the outflow section is disposed on the other end section of the holding member in the arranging direction of the plurality of wavelength conversion elements, the piping and so on for connecting the inflow section and the outflow section becomes longer. Thus, when such a light source device is used for the projector, there might be caused a limitation in layout of the light source device depending on the shape of the housing. Therefore, since in the light source device according to this aspect of the invention, the inflow section and the outflow section are disposed on one end section of the holding member in the arranging direction of the plurality of wavelength conversion elements, the piping and so on for connecting the inflow section and the outflow section can be shorter, thus it becomes possible to achieve downsizing.

Further, in the light source device according to this aspect of the invention, it is preferable that the inflow section is disposed nearer to the side of an entrance end surface of the wavelength conversion element than the outflow section.

In the light source device according to this aspect of the invention, the temperature of the side of the entrance end surface of the wavelength conversion element, which the light beam emitted from the light emitting section enters becomes higher than the temperature of the side of the exit end surface thereof. On this occasion, by making the temperature control medium the temperature of which is controlled to be a desired value flow in on the side of the entrance end surface of the wavelength conversion element, it becomes possible to efficiently control the temperature of the wavelength conversion element to be the desired value.

Further, in the light source device according to this aspect of the invention, it is preferable that an inflow section allowing the temperature control medium to flow into the housing space is provided to one end section of the holding member in the arranging direction of the plurality of wavelength conversion elements, an outflow section allowing the temperature control medium to flow out from the housing space is provided to the other end section of the holding member in the arranging direction of the plurality of wavelength conversion elements, and the inflow section and the outflow section are communicated to each other with the circulating channel.

In the light source device according to this aspect of the invention, since the inflow section is provided to one end section of the holding member in the arranging direction of the plurality of wavelength conversion elements, and an outflow section is provided to the other end section of the holding member in the arranging direction of the plurality of wavelength conversion elements, the temperature control medium flows along only one direction in the arranging direction of the wavelength conversion elements. On this occasion, since the circulating channel is disposed outside the holding member, it becomes easy to make the temperature control medium flow in one direction. Thus, in the case of using, for example, the cooled temperature control medium, the temperature becomes low at the wavelength conversion element disposed upstream, and gradually rises towards the wavelength conversion elements disposed downstream thereof. As described above, since the plurality of wavelength conversion elements are provided with a little temperature gradient, the temperature is different among the wavelength conversion elements, and consequently the wavelengths of the light beams emitted from the plurality of wavelength conversion elements are different from each other. Therefore, since the coherency of the light beams can be reduced, it becomes possible to reduce the speckle noise.

Further, in the light source device according to this aspect of the invention, it is preferable that a temperature measuring section for measuring the temperature of at least one of the wavelength conversion elements is disposed inside the housing space, and the temperature control section varies a flow rate of the temperature control medium based on the temperature measured by the temperature measuring section.

In the light source device according to this aspect of the invention, the temperature control section varies the flow rate of the temperature control medium based on the temperature measured by the temperature measuring section, and consequently, it becomes possible to more accurately control the temperature of the wavelength conversion elements.

Further, in the light source device according to this aspect of the invention, it is preferable that the housing space is provided for every one of the plurality of wavelength conversion elements.

In the light source device according to this aspect of the invention, since the housing spaces are provided correspondingly to the respective wavelength conversion elements, the temperature of the wavelength conversion element can separately be controlled, and consequently, it becomes easy to control the temperature of the wavelength conversion element so that the pitch of the periodic polarization inversion structure of the wavelength conversion element becomes a predetermined pitch.

Further, in the light source device according to this aspect of the invention, it is preferable that the holding member is provided for every one of the plurality of wavelength conversion elements, and the holding members are disposed with predetermined intervals.

In the light source device according to this aspect of the invention, the holding members are provided correspondingly to the plurality of wavelength conversion elements, and are disposed with predetermined intervals. Thus, since the temperature of the wavelength conversion element can be controlled individually, and the heat conduction between the holding members respectively holding the adjacent wavelength conversion elements is prevented, it becomes possible to perform more accurate temperature control for every wavelength conversion element.

Further, in the light source device according to this aspect of the invention, it is preferable that the temperature control section includes a temperature varying section for varying the temperature of the wavelength conversion element via the temperature control medium, and a flow section for making the temperature control medium flow, and the temperature varying section and the flow section are provided separately from the holding member.

Here, if the temperature varying section and the flow section are provided to the holding member, there are caused some limitations on the sizes of the temperature varying section and the flow section. Thus, it becomes difficult to provide the temperature varying section having high temperature varying power or the flow section with high circulating power. Therefore, in this aspect of the invention, by providing the temperature varying section and the flow section separately from the holding member, it becomes possible to eliminate the limitations on the sizes of the temperature varying section and the flow section.

Further, in the light source device according to this aspect of the invention, it is preferable that the temperature control section includes a temperature varying section for varying the temperature of the wavelength conversion element via the temperature control medium, and a flow section for making the temperature control medium flow, and the temperature varying section and the flow section are provided to the holding member.

In the light source device according to this aspect of the invention, since the temperature varying section and the flow section are provided to the holding member, it becomes possible to form the holding member, the temperature varying section, and the flow section integrally with each other. Further, since it is possible to directly change the temperature of the temperature control medium in the housing space or to directly make the temperature control medium flow by providing the temperature varying section and the flow section inside the housing space of the holding member, it becomes possible to effectively circulate the temperature control medium in the housing space.

Further, in the light source device according to this aspect of the invention, it is preferable that the holding member is provided with a positioning section for positioning the wavelength conversion element in a proceeding direction of the light beam.

In the light source device according to this aspect of the invention, the holding member is provided with a positioning section for positioning the wavelength conversion element. Thus, since the position of the wavelength conversion element in the proceeding direction of the incident light beam is more accurately fixed, it becomes possible to keep the distance between the plurality of light emitting sections and the entrance end surfaces of the plurality of wavelength conversion elements corresponding thereto constant.

Further, in the light source device according to this aspect of the invention, it is preferable that the wavelength conversion element has a growth striation caused by a periodic variation in one of crystal composition and impurity concentration, and the growth striation forms the periodic polarization inversion structure.

In the light source device according to this aspect of the invention, the wavelength conversion element, in which the growth striation caused by a periodic variation in crystal composition or impurity concentration is provided, and the growth striation forms the periodic polarization inversion structure, is an element manufactured by introducing the polarization inversion structure in the crystal using the Czochralski method (hereinafter abbreviated as CZ method) on the single crystal. The wavelength conversion element manufactured by this method has an advantage of low price, and in general, has a substantially circular cross-sectional shape in the direction perpendicular to the proceeding direction of the light beam. In particular, when the cross-sectional shape of the wavelength conversion element is a roughly circular shape, the flow resistance of the temperature control medium in the housing space becomes low in comparison with the case with the cuboid shape, thus the temperature control medium can flow efficiently. Thus, it becomes easy to control the temperature of the plurality of wavelength conversion elements to be a predetermined temperature.

Further, a projector according to another aspect of the invention includes the light source device described above, and an image forming device using the light beam from the light source device to display an image of a desired size on a display surface.

In the projector according to this aspect of the invention, the light beam emitted from the light source device inters the image forming device. Then, the image of a desired size is displayed on the display surface by the image forming device. On this occasion, since the light beam emitted from the light source device is a light beam with the suppressed speckle noise as described above, it becomes possible to display a clear image with reduced dazzle.

BRIEF DESCRIPTION OF THE DRAWINGS

The invention will now be described with reference to the accompanying drawings, wherein like numbers reference like elements.

DESCRIPTION OF EXEMPLARY EMBODIMENTS

Figure 1:
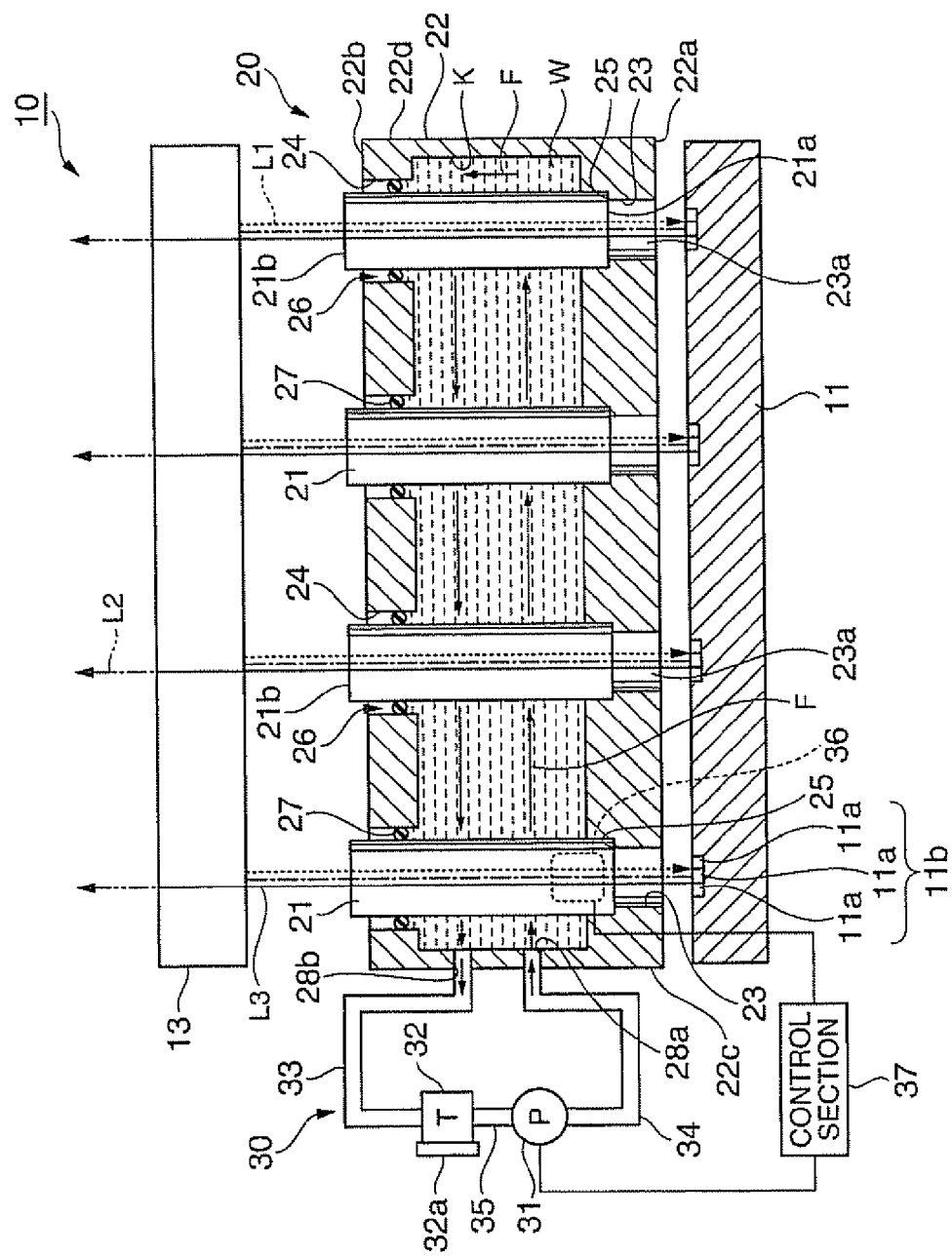
FIG. 1 is a cross-sectional view showing a substantial part of a light source device according to a first embodiment of the invention.

Hereinafter, some embodiments of a light source device and a projector according to the invention will be explained with reference to the accompanying drawings. It should be noted that the scale size of each member is accordingly altered so that the member is shown large enough to be recognized in the drawings below.

First Embodiment

A first embodiment of the invention will be explained with reference to FIGS. 1 through 3.

Figure 2:
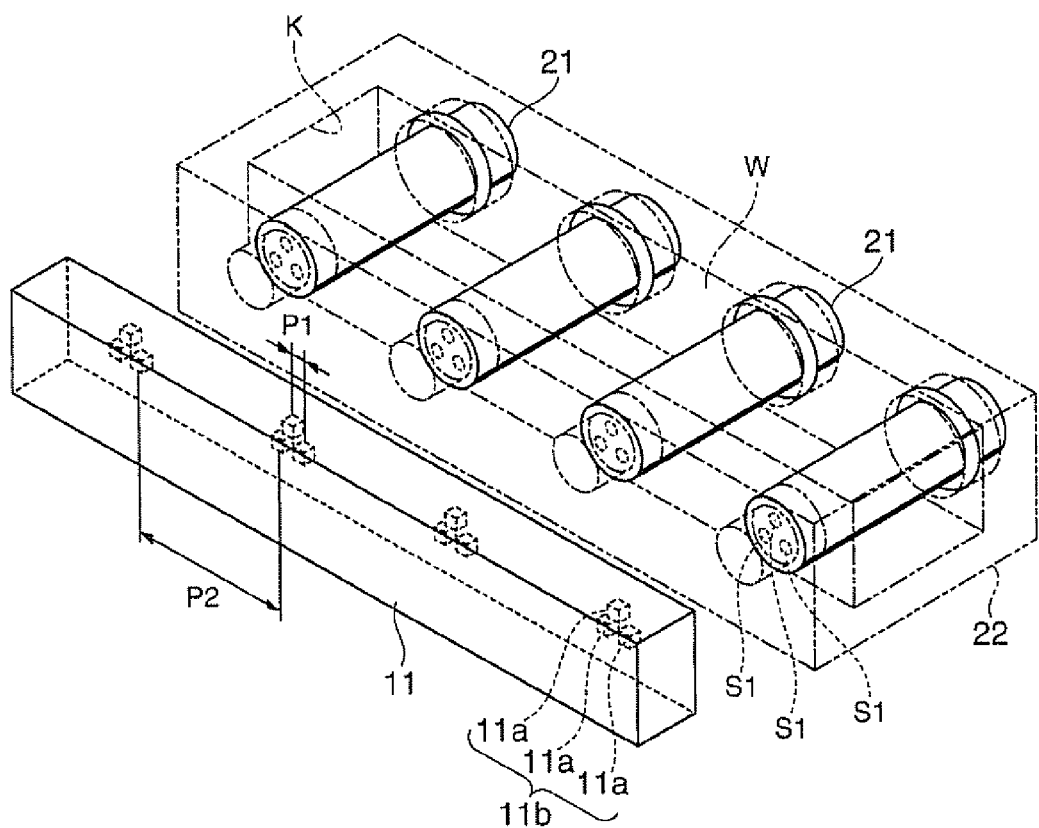
FIG. 2 is a perspective view of a part of the light source device shown in FIG. 1.
Figure 3:
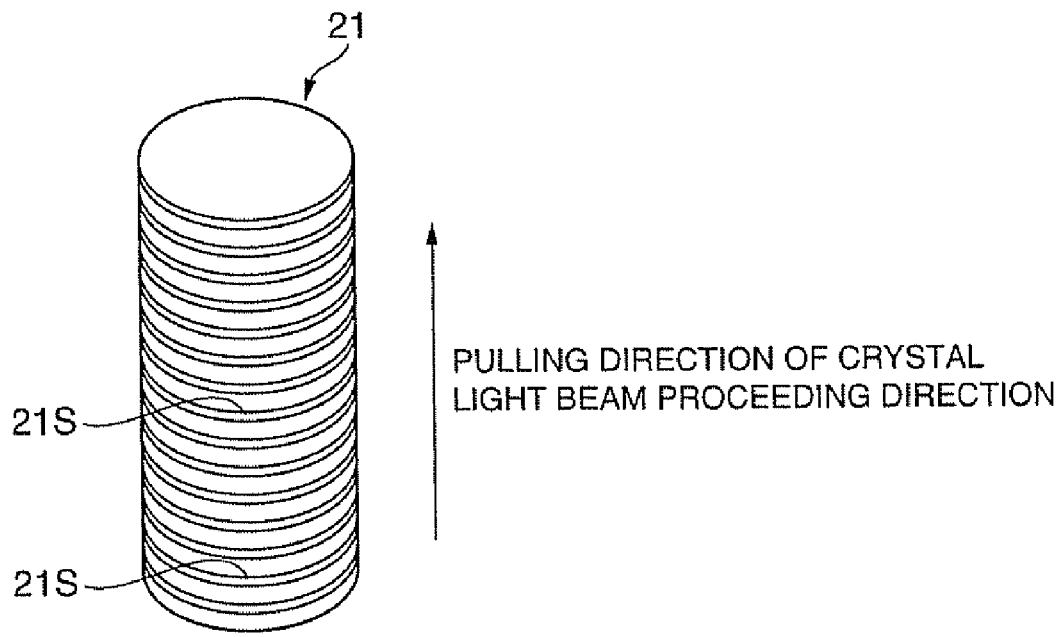
FIG. 3 is a perspective view showing a wavelength conversion element of the light source device shown in FIG. 1.

FIG. 1 is a diagram showing a schematic configuration of a light source device, FIG. 2 is a perspective view of the light source device in which a wavelength selection element 13 is omitted, and a wavelength conversion element unit 20 is simplified, and FIG. 3 is a perspective view of a wavelength conversion element. It should be noted that the explanation will be presented with reference to FIG. 1 showing only a light path of a laser beam emitted from one emitter in order for presenting an easy-to-understand explanation of a path of a light beam emitted from a semiconductor laser element and proceeding towards the wavelength selection element.

As shown in FIG. 1, a light source device 10 according to the embodiment of the invention is provided with a semiconductor laser element 11, a wavelength conversion element unit 20 for converting the wavelength of the light emitted from the semiconductor laser element 11, and a wavelength selection element 13 for transmitting the light on which the wavelength conversion is executed by the wavelength conversion element unit 20 and selectively reflecting the light with the wavelength on which the conversion is not executed. Further, the wavelength conversion unit 20 is provided with four wavelength conversion elements 21.

The semiconductor laser element (light source) 11 is provided with a plurality of emitters (light emitting sections) 11a with a predetermined pitch as shown in FIG. 1. Since a specific configuration of the semiconductor layer element 11 has no difference from that in the past one, a detailed explanation therefor will be omitted. Since the semiconductor laser element 11 is provided with a plurality of emitters 11a, even if each of the emitters 11a has a small output, a high output can be obtained as a whole.

As shown in FIG. 2, the plurality of emitters 11a is arranged in two lines, and an emitter group 11b is formed for every three emitters 11a disposed so as to be arranged at respective apexes of a triangle. Each emitter group 11b composed of three emitters 11a forms the triangle with one emitter 11a in the upper line and two emitters 11a in the lower line.

As described above, a total of 12 emitters 11a are arranged forming the group for every three emitters 11a.

Further, a pitch P1 between the emitters 11a in each emitter group 11b is smaller than a distance P2 between the emitter 11a at an end of one emitter group 11b and the emitter 11a at an end of an adjacent emitter group 11b.

Then, the wavelength conversion element unit 20 will be explained.

As shown in FIG. 1, the wavelength conversion element unit 20 is provided with four wavelength conversion elements 21, a holding member 22 for holding the wavelength conversion elements 21, and a temperature control section 30 for controlling the temperature of the wavelength conversion elements 21.

The wavelength conversion element (a second harmonic wave generation (SHG) element) 21 is a nonlinear optical element for converting the light (illustrated with the solid line in FIG. 1) L3 with a fundamental wave emitted from the semiconductor laser element 11 into the light with roughly a half wavelength thereof, and the stronger the intensity of the incident laser beam to the wavelength conversion element 21 is, the more the conversion efficiency is improved, for example. Further, the whole of the laser beam emitted from the semiconductor laser element 11 is not necessarily converted into the laser beam with a predetermined wavelength.

Further, as shown in FIG. 2, each of the wavelength conversion elements 21 corresponds to either one of the emitter groups 11b each composed of the three emitters 11a, and is disposed so as to be opposed thereto.

As the nonlinear optical crystal for forming the wavelength conversion element 21, there has been often used a cuboid bulk crystal carved out from a wafer made of a material such as lithium niobate (LiNbO$_3$) in the past. The bulk nonlinear optical crystal has been manufactured through the steps of forming electrodes for polarization inversion process in the form of a wafer, carving out a plurality of chips from the wafer, performing the polarization inversion process by applying a voltage, polishing an entrance surface and an exit surface, applying anti-reflection coating to the entrance surface and the exit surface.

Although the cuboid bulk crystal described above can also be used, in the present embodiment, a crystal obtained by growing a single crystal of LiNbO$_3$ using the Czochralski (CZ) method is used. According to this manufacturing method, the polarization inversion structure is artificially introduced in the crystal while pulling the crystal for growth. In general, as shown in FIG. 3, a fine periodic variation in impurity concentration or composition called growth striation 21S is introduced in the growth axis direction (corresponding to a proceeding direction of the light beam) correspondingly to the solid-liquid interface. The growth striation 21S can be formed by periodically varying the temperature of the growth interface (melt interface) during the pulling growth of the single crystal. Therefore, the wavelength conversion element having the polarization inversion structure with a different pitch can be manufactured only by controlling the melt temperature in manufacturing the crystal by the pulling method. According to such a manufacturing method, the wavelength conversion element 21 thus manufactured can obtain the structure in which domains with polarization inverted from each other are repeated along the pulling direction of the crystal. Further, the pulling direction of the crystal is arranged to be the proceeding direction of the laser beam emitted from the laser element 11.

Further, by pulling the crystal, the wavelength conversion element 21 can be made to have an elliptic cross-sectional shape instead of the cylindrical shape with the circular cross-sectional shape as shown in FIG. 2.

The wavelength conversion element manufactured using the CZ method has the following advantages. The CZ method makes it possible to manufacture the wavelength conversion element with a simplified process and low cost compared to the photolithography method and the etching method in the past method, which forms the electrodes for the polarization inversion process. Specifically, the tools such as a photo mask can be eliminated to cut the initial cost, and in addition, changes to the specification such as a change of the polarization inversion pitch can be performed with ease.

Further, in the cuboid bulk type, there arises the case in which the polarization inversion area is narrowed from one surface of the wavelength conversion element 21 towards the other surface thereof, which causes deviation of polarization. Since the polarization inversion pitch is thus made no longer constant, the conversion efficiency of the light varies depending on the position the laser beam enters. However, the wavelength conversion element 21 manufactured using the CZ method has a polarization inversion pitch constant in a direction of the surface perpendicular to the proceeding direction of the laser beam. Thus, it is not required to tighten the positioning accuracy in the surface direction with respect to the emitters.

Further, the semiconductor laser element 11 is provided with, for example, a radiator plate or a cooling mechanism, not shown, for cooling the semiconductor laser element 11, which rises in temperature by the heat generated in the emitters 11a. In the present embodiment, as shown in FIG. 2, each of the emitter groups 11b each composed of the three emitters 11a corresponds to either one of the wavelength conversion elements 21. In other words, the three laser beams emitted from the three emitters 11a belonging to each of the emitter groups 11b enter the corresponding one of the wavelength conversion elements 21. Therefore, the cross-sectional area of the wavelength conversion element 21 is large enough for three spots S1 emitted from the three emitters 11a to enter the wavelength conversion element 21.

In the present embodiment, since the semiconductor laser element 11 includes four emitter groups 11b, assuming that the average value of the wavelengths of the three emitters 11a belonging to each of the emitter groups 11b as "an average wavelength," four average wavelengths, therefore, exist. The average wavelength of at least one emitter group 11b out of these average wavelengths is different from the average wavelengths of the rest of the emitter groups 11b. It should be noted that by making all of the average wavelengths different from each other, the scintillation can be reduced to a maximum extent.

Further, focusing attention to the three emitters 11a belonging to one of the emitter groups 11b, it is possible to make the wavelengths of the three laser beams emitted from the three emitters 11a different from each other or to make all of the wavelengths of the three laser beams identical to each other. In the case in which the wavelengths of the laser beams emitted from the respective emitters 11a are thus made different from each other, in view of the color purity of the output laser beams, consistency with the wavelength conversion elements 21 or the wavelength selection element 13, and so on, the wavelength difference is preferably set smaller less than or comparable to 10 nm.

As shown in FIG. 2, each of the wavelength conversion elements 21 composing the wavelength conversion element unit 20 has a one-to-one correspondence with either one of the emitter groups (three emitters 11a) 11b, and therefore, is phase-matched with the corresponding emitter group 11b. If, for example, all of the wavelengths of the laser beams from the three emitters 11a in one emitter group 11b are the same, the wavelength conversion element 21 is phase-matched with that wavelength. Alternatively, if the wavelengths of the laser beams from the three emitters 11a in one emitter group 11b are different from each other, the wavelength conversion element 21 is phase-matched with, for example, the average value of the wavelengths. As the method of phase-matching, there can be considered a method of making the pitches of the periodic polarization inversion structures when manufacturing the wavelength conversion elements different from each other, and a method of making the pitches of the periodic polarization inversion structure different from each other by thermal expansion by controlling the temperature of the wavelength conversion elements while making the pitches of the periodic polarization inversion structure when manufacturing the wavelength conversion elements identical to each other, and the former method is adopted in the present embodiment. In other words, in the present embodiment, the pitch of the periodic polarization inversion structure of the wavelength conversion element 21 is set to the pitch corresponding to the average wavelength of the emitter group 11b.

Further, in order for making the pitches of the periodic polarization inversion structures different from each other, it is enough to make the periods of the variation in the melt interface temperature different when pulling the single crystals.

As shown in FIG. 1, the holding member 22 of the wavelength conversion element unit 20 has a cuboid shape and provided with a housing space K inside thereof. Further, the holding member 22 is provided with four entrance side through holes 23 formed along the end surface 22a on the side on which the semiconductor laser element 11 is disposed, and penetrating from the end surface 22a towards the housing space K, and four exit side through holes 24 formed along the end surface 22b on the opposite side of the end surface 22a and penetrating from the end surface 22b towards the housing space K. The wavelength conversion element 21 is held by the entrance side through hole 23 and the exit side through hole 24. The housing space K is filled with a temperature control medium W. As the temperature control medium W, a liquid with high heat conductivity is preferable, and in the present embodiment, water processed with an antifreeze treatment is used.

Further, the inside diameter of the entrance side through hole 23 is not constant from one end to the other, but the inside diameter on the housing space K side is roughly equal to or slightly greater than the outside diameter of the wavelength conversion element 21 while the inside diameter on the end surface 22a side is smaller than the outside diameter of the wavelength conversion element 21. Specifically, a slight step 25 is formed in the inside wall of the entrance side through hole 23.

The inside diameter of the exit side through hole 24 is arranged to be slightly larger than the outer diameter of the wavelength conversion element 21, and a gap 26 is formed between the wavelength conversion element 21 and the inside wall of the exit side through hole 24. Further, a seal member 27 made of an elastic material and larger than the gap 26 is disposed in the gap 26. The seal member 27 is an O-ring or a packing made, for example, of acrylonitrile-butadiene rubber (NBR), ethylene-propylene rubber (EPDM), or styrene-butadiene rubber (SBR). Thus, the temperature control medium W in the housing space K is prevented from leaking through the exit side through hole 24.

According to the configuration described above, when the entrance end surface 21a side of the wavelength conversion element 21 is inserted into the entrance side through hole 23 from the end surface 22b of the holding member 22, it gets stuck with the step 25 and does not proceed further, and consequently, the wavelength conversion element 21 is positioned in the growth axis direction with respect to the holding member 22. The position of the exit end surface 21b side of the wavelength conversion element 21 is fixed by the elastic force of the seal member 27. In this manner, the condition in which four wavelength conversion elements 21 are dipped in the temperature control medium W filling a single housing space K is formed.

Further, each of the wavelength conversion elements 21 and the holding member 22 are fixed with a UV curing adhesive (not shown) in the condition in which each of the wavelength conversion elements 21 is positioned to the holding member 22 so that the four wavelength conversion elements 21 are arranged in one direction. Thus, the temperature control medium W in the housing space K is prevented from leaking through the entrance side through holes 23 and the exit side through holes 24. Further, in each of the entrance side through holes 23, there is disposed a seal member 23a in order for preventing the temperature control medium W in the housing space K from leaking. Further, since the laser beam emitted from the emitter 11a enters through the entrance side through hole 23, the seal member 23a is preferably made of resin with light permeability or the like, and is desirably made of a material with a refractive index similar to that of the wavelength conversion element 21.

Further, although the exit end surface (the end surface on the opposite side of the side having contact with the step 25) 21b of each of the wavelength conversion elements 21 protrudes from the holding member 22 in FIG. 1, it is also possible to polish the protruding section so as to be in-plane with the end surface 22b of the holding member 22, and provide an anti-reflection coating treatment on the exit end surface 21b of each the wavelength conversion elements 21. By executing such a process, the process is simplified compared to the case in which the wavelength conversion element 21 alone is polished and then provided with the anti-reflection coating treatment one-by-one, and the production yield is also improved. Further, since the positions of the end surfaces are aligned among the wavelength conversion elements 21, the wavelength conversion element unit 20 with a stable characteristic as a whole can be obtained.

Further, as shown in FIG. 1, the holding member 22 is provided with an inflow port (inflow section) 28a for allowing the temperature control medium W to flow in the housing space K, and an outflow port (outflow section) 28b for allowing the temperature control medium W to flow out from the housing space K. Specifically, the inflow port 28a and the outflow port 28b are formed towards the housing space K in the left end section 22c, the plane perpendicular to the arranging direction of the wavelength conversion elements 21, shown in the left of the sheet. By providing such an inflow port 28a to the left end section 22c of the holding member 22, it becomes possible to make the temperature control medium W flow in the arranging direction of the wavelength conversion elements 21. Further, the outflow port 28b is disposed at the position shifted towards the exit end surface 21b of the wavelength conversion element 21 from the inflow port 28a.

Thus, illustrating the flow of the temperature control medium W with the arrow F in FIG. 1, the temperature control medium W in the housing space K flows in from the entrance end face 21a side of the wavelength conversion element 21 disposed nearest to the left end section 22c, and proceeds along the entrance end surface 21a side in the arranging direction of the wavelength conversion elements 21. Then, when the temperature control medium W reaches the right end section 22d on the opposite side of the left end section 22c, the temperature control medium W proceeds from the side of the wavelength conversion element 21 disposed nearest to the right end section 22d towards the side of the wavelength conversion element 21 disposed nearest to the left end section 22c. On this occasion, the temperature control medium W returns to the left end section 22c passing through the exit end surface 21b side of the wavelength conversion elements 21. Thus, the temperature control medium W is convected counterclockwise in the housing space K. It should be noted that a current plate can also be provided to the holding member 22 in order for encouraging the temperature control medium W to flow along the arranging direction of the wavelength conversion elements 21.

As shown in FIG. 1, the temperature control section 30 is provided with a pump (a flow section) 31, a reservoir tank 32, pipings (circulating channel) 33, 34, 35, a temperature sensor 36, and a control section 37. Among these components, all of the components except the temperature sensor 36 are provided separately from the wavelength conversion element unit 20.

The piping 33 is communicated with the outflow port 28b provided to the left end section 22c of the holding member 22, and the piping 34 is communicated with the inflow port 28a provided to the left end section 22c of the holding member 22. Further, the piping 33 is connected to the piping 34 via the reservoir tank 32 and the pump 31. Still further, the pump 31 and the reservoir tank 32 are connected to each other via the piping 35.

According to this configuration, the pump 31 delivers the temperature control medium W flowing out from the outflow port 28b and reserved in the reservoir tank 32 to the inflow port 28a. Further, the reservoir tank 32 is for reserving the temperature control medium W, and is arranged to radiate heat from the temperature control medium W, which is heated and flows out from the holding member 22, by a heat sink (temperature varying section) 32a provided to the reservoir tank 32. It should be noted that the configuration of providing two or more radiator fins to the reservoir tank 32 can also be adopted.

Further, the temperature sensor 36 is for measuring the temperature of the wavelength conversion element 21, and is provided to the wavelength conversion element 21 disposed on the left end section 22c side of the holding member 22.

Further, the control section 37 controls the pump 31 based on the temperature of the wavelength conversion element 21 measured by the temperature sensor 36.

Here, the average wavelength of at least one emitter group 11b is different from the average wavelengths of the rest of the emitter groups 11b. Further, since the pitches of the wavelength conversion elements 21 are different, the wavelength of the light emitted from at least one of the wavelength conversion elements 21 becomes different from the wavelength of the light emitted from the rest of the wavelength conversion elements 21, by the temperature control section 30 controlling the temperature of the four wavelength conversion elements 21 to be substantially the same.

Specifically, the control section 37 controls the flow volume of the pump 31 per unit time based on the temperature of the wavelength conversion elements 21 measured by the temperature sensor 36 to vary the flow rate of the temperature control medium W delivered from the pump 31. In other words, if the temperature measured by the temperature sensor 36 is higher than a predetermined temperature (the phase matching temperature), the control section 37 controls the pump 31 so as to raise the flow rate of the temperature control medium W, and if the temperature measured by the temperature sensor 36 is lower than the predetermined value, the control section 37 controls the pump 31 so as to decrease the flow rate of the temperature control medium W. By thus executing the feedback control on the temperature of the wavelength conversion elements 21, it becomes possible to keep the temperature of all of the wavelength conversion elements 21 constant.

Further, as shown in FIG. 1, the wavelength selection element 13 is for functioning as a resonator mirror of the emitters 11a by selecting the laser beam (illustrated with the broken line in FIG. 1) L1 with a predetermined selection wavelength and emitted from the wavelength conversion elements 21 and reflect it towards the semiconductor laser elements 11, and also for transmitting the laser beam (illustrated with the chain double-dashed line in FIG. 1) L2 thus converted. As the wavelength selection element 13, an optical element such as a hologram having a periodic lattice can be used.

Then, the temperature control of the wavelength conversion elements 21 will be explained.

The temperature control medium W delivered by the pump 31 flows into the housing space K of the holding member 22 from the inflow port 28a through the piping 34. Further, the temperature control medium W proceeds along the side of the entrance end surfaces 21a of the wavelength conversion elements 21 of the housing space K, and then turns at the right end section 22d of the holding member 22 towards the left end section 22c along the side of the exit end surfaces 21b of the wavelength conversion elements 21. Thus, the temperature control medium W flows counterclockwise in the housing space K.

On this occasion, the heat is transferred from the wavelength conversion elements 21 heated by the laser beams emitted from the semiconductor laser elements 11 to the temperature control medium W, and is then radiated to the outside by the heat sink via the reservoir tank 32. Then, the temperature control medium W thus cooled flows into the housing space K of the holding member 22 from the piping 34 again.

In the light source device 10 according to the present embodiment, the average wavelength in at least one of the emitter groups 11b is different from the average wavelengths in the rest of the emitter groups 11b, and the wavelength conversion elements 21 corresponding the average wavelengths are provided. Thus, by controlling the temperature of the plurality of wavelength conversion elements 21 to be the same by the temperature control section 30, the coherency of the light beams emitted from the different wavelength conversion elements 21 can be reduced.

In other wards, the light source device 10 of the present embodiment can efficiently emit the light beam having low coherency by performing the temperature control of the wavelength conversion elements 21.

Further, since the inflow port 28a and the outflow port 28b are provided to one side (the left end section 22c) of the holding member 22, the pipings 33, 34, 35 for connecting the inflow port 28a and the outflow port 28b to each other can be made short, thus downsizing can be achieved.

Further, since the temperature of the side of the entrance end surface 21a, which the light beam emitted from the emitter 11a enters, becomes higher than the temperature of the side of the exit end surface 21b, by disposing the inflow port 28a at the position nearer to the side of the entrance end surface 21a of the wavelength conversion element 21 than the outflow port 28b, the temperature control medium W thus cooled firstly has contact with the side of the entrance end surface 21a, thus the temperature of the wavelength conversion elements 21 can efficiently be controlled to be a desired temperature.

Further, since the cross-sectional shape of the wavelength conversion element 21 is a roughly circular shape, the flow resistance of the temperature control medium W in the housing space K becomes low in comparison with the case with the cuboid shape, thus the temperature control medium W can flow efficiently. Thus, it becomes easy to control the temperature of the four wavelength conversion elements 21 to be a predetermined temperature.

Further, since the temperature control medium W flows along the arranging direction of the four wavelength conversion elements 21, the temperature control medium W can have contact with the four wavelength conversion elements 21 while flowing. Thus, it becomes easy to control the temperature of the four wavelength conversion elements 21.

Further, the pitch P1 of the emitters 11a is smaller than the pitch P2 of the emitters 11a at the end of the emitter groups 11b, it can be prevented that the heat generated in the emitters 11a is accumulated to cause the high temperature at the center of the semiconductor laser element 11, thus the equalization of the temperature among the emitters 11a can be achieved. Further, the freedom of the arrangement of the wavelength conversion elements 21 with respect to the respective emitters 11b can be increased.

Still further, by providing the pump 32 and the heat sink 32a to the holding member 22, downsizing of the overall device can be achieved. Further, by providing them in the housing space K of the holding member 22, it becomes possible to directly change the temperature of the temperature control medium W in the housing space K or to directly make the temperature control medium W flow, thus making it possible to efficiently circulate the temperature control medium W in the housing space K.

However, if the pump 31 and the reservoir tank 32 are provided to the holding member 22, there might occur some limitations in the sizes of the pump 31 and the reservoir tank 32 in some cases. Thus, it becomes difficult to provide a pump having high circulation power or a reservoir tank with high cooling power. Therefore, in the present embodiment, the pump 31 and the reservoir tank 32 are disposed separately from the holding member, thus the limitations in the sizes of the pump 31 and the reservoir tank 32 can be eliminated.

Further, although the water is used as the temperature control medium, a liquid other than water can also be adopted, and a gas can also be adopted. Still further, although the pump is used as the flow section and the reservoir tank is used as the temperature varying section, these are not limitations.

Further, although the temperature of the plurality of wavelength conversion elements 21 is equalized by cooling the temperature control medium W, and then cooling the wavelength conversion elements 21, the configuration of providing a heater to the reservoir tank 32 can also be adopted. According to this configuration, the temperature of the plurality of wavelength conversion elements 21 can be equalized by heating the wavelength conversion elements 21.

It should be noted that although four wavelength conversion elements 21 are used in the present embodiment, in order for further reducing generation of the speckle noise, it is preferable to provide as many wavelength conversion elements 21 as possible and the emitter groups 11b corresponding thereto, and to make the average wavelength in the emitter group 11b different from the average wavelength in another emitter group 11b.

Further, although the configuration of providing each of the emitter groups 11b with three emitters 11a is adopted, this is not a limitation. By increasing the number of emitters 11a included in each of the emitter groups 11b, generation of the speckle noise can further be reduced.

Still further, although the temperature sensor 36 and the control section 37 can be eliminated, by controlling the flow rate by the control section 37 based on the value of the temperature sensor 36, it becomes possible to control the temperature further accurately.

Moreover, it is possible to control the temperature of the temperature control medium W reserved in the reservoir tank 32 with a constant flow rate.

Further, although the temperature sensor 36 is provided to the wavelength conversion element 21 on the left end section 22c side of the holding member 22, the wavelength conversion element 21 to which the temperature sensor 36 is provided is not limited thereto, but any of the wavelength conversion elements 21 can be provided with the temperature sensor 36. Still further, two or more temperature sensors 36 can be provided to two or more wavelength conversion elements 21. Moreover, the position to which the temperature sensor 36 is provided is not limited to the wavelength conversion elements 21, but it is also possible to provide the temperature sensor 36 to the inside wall of the housing space K to measure the temperature of the temperature control medium W.

Further, by providing fixing members for holding to fix the respective wavelength conversion elements 21 on the end surface 22b side of the holding member 22, the wavelength conversion elements 21 can more stably be fixed in position.

Second Embodiment

Figure 4:
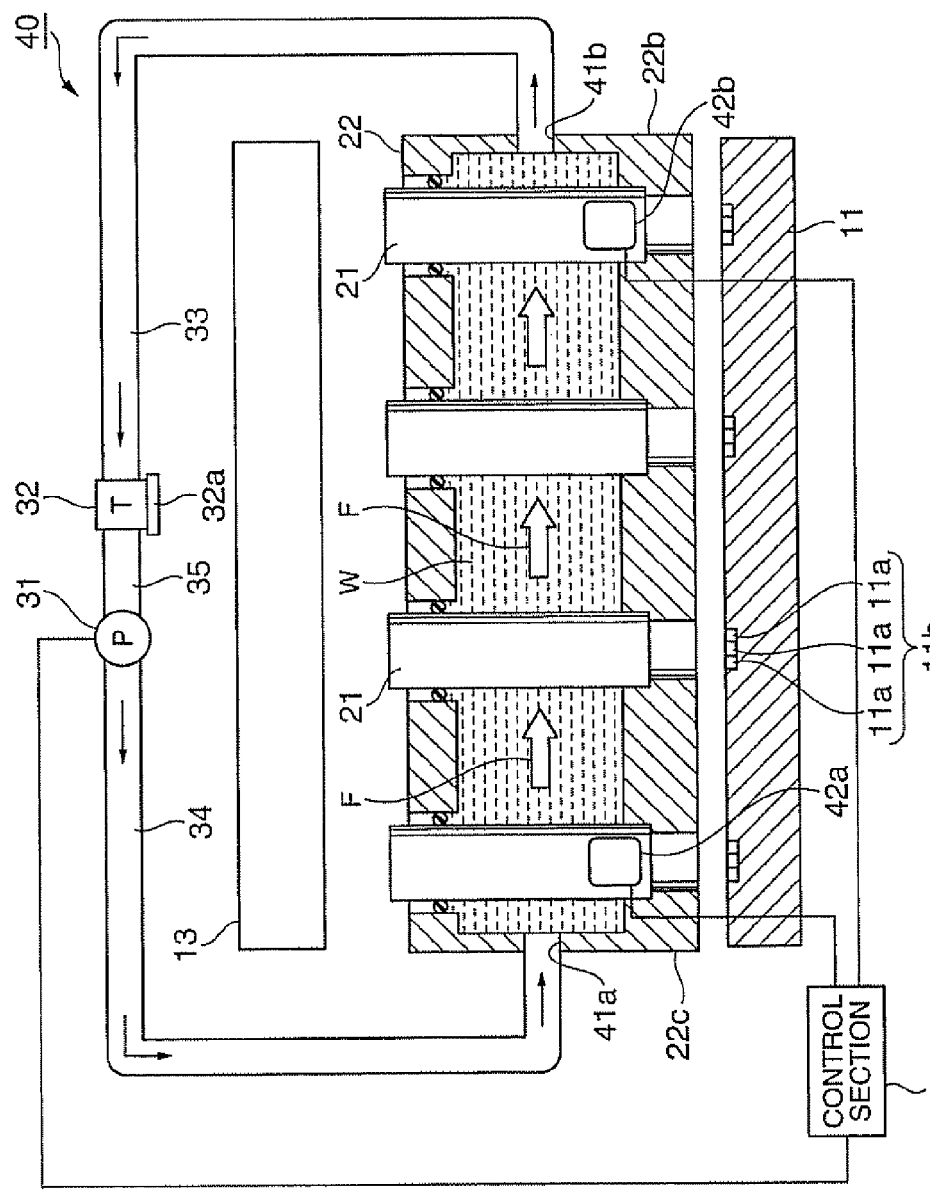
FIG. 4 is a cross-sectional view showing a substantial part of a light source device according to a second embodiment of the invention.

A second embodiment according to the invention will now be explained with reference to FIG. 4. It should be noted that in the drawing of each of the embodiments described hereinafter, portions with configurations common to the light source device 10 according to the first embodiment described above will be denoted with the same reference numerals, and the explanations therefor will be omitted.

The light source device 40 according to the present embodiment is different from the first embodiment in the layout of the inflow port 41a and the outflow port 41b. The light source device 40 is the same as the first embodiment in the other configurations.

The inflow port 41a is provided to the left end section 22c of the holding member 22, and the outflow port 41b is provided to the right end section 22d of the holding member 22. In other words, the inflow port 41a and the outflow port 41b are formed in a direction (a direction perpendicular to the growth axis direction) parallel to the arranging direction of the wavelength conversion elements 21 towards the housing space K of the holding member 22. By providing the inflow port 28a and the outflow port 28b in this manner, it becomes possible to make the temperature control medium W flow in the arranging direction of the wavelength conversion elements 21.

Further, similarly to the first embodiment, the inflow port 41a and the outflow port 41b are connected to each other via the pump 31, the reservoir tank 32, the pipings 33, 34, 35. Still further, the temperature sensors 42a, 42b are for measuring the temperature of the wavelength conversion elements 21, wherein the temperature sensor 42a is provided to the wavelength conversion element 21 disposed on the side of the left end section 22c of the holding member 22, and the temperature sensor 42b is provided to the wavelength conversion element 21 disposed on the side of the right end section 22d of the holding member 22.

Further, the temperature sensors 42*a*, 42*b* are connected to the control section 45 provided to the pump 31.

Still further, in the present embodiment, the temperature control medium W in the housing space K flows only one direction (from the left end section 22*c* of the holding member 22 towards the right end section 22*d* thereof). Thus, it becomes possible for the control section 45 to control the temperature of the wavelength conversion elements 21 so as to be the lowest in the wavelength conversion element 21 on the inflow port 41*a* side out of the four wavelength conversion elements 21, and rise as the distance of the wavelength conversion element 21 from the outflow port 41*b* decreases by controlling the flow rate of the temperature control medium W in the housing space K.

The control section 45 controls the flow volume per unit time based on the temperature difference of the wavelength conversion elements 21 measured by the temperature sensors 42*a*, 42*b* to vary the flow rate of the temperature control medium W delivered from the pump 31. In other words, if the difference of the temperature measured by the temperature sensors 42*a*, 42*b* is greater than a predetermined temperature difference, the control section 45 controls the pump 31 so as to raise the flow rate of the temperature control medium W, and if the difference of the temperature measured by the temperature sensors 42*a*, 42*b* is smaller than the predetermined temperature difference, the control section 45 controls the pump 31 so as to decrease the flow rate of the temperature control medium W. In the manner as described above, the temperature gradient is provided to the four wavelength conversion elements 21.

Further, although the temperature is controlled to be the same in all of the wavelength conversion elements 21, thereby making the pitches of the periodic polarization inversion structure of the wavelength conversion elements 21 different from each other as the method of the phase matching in the first embodiment, the temperature is made different among the wavelength conversion elements 21 in the present embodiment. Therefore, the pitches of the periodic polarization inversion structures of the four wavelength conversion elements 21 are substantially the same. Specifically, although the output wavelengths of the emitters 11*a* are different from each other since the semiconductor laser elements 11 have the same configurations as those of the first embodiment, since the pitches of the periodic polarization inversion structures of the wavelength conversion elements 21 are the same, the phase matching between the wavelength conversion elements 21 and the corresponding emitter groups 11*b* is not achieved. Therefore, it is arranged that the phase matching is achieved by keeping a predetermined temperature difference between the wavelength conversion elements 21.

In the light source device 40 according to the present embodiment, since the inflow port 41*a* is provided to the left end section 22*c* of the holding member 22 of the wavelength conversion element 21 and the outflow port 41*b* is provided to the right end section 22*d* of the holding member 22, it is possible to make the temperature control medium W flow only in one direction of the arranging direction of the wavelength conversion elements 21. Thus, the four wavelength conversion elements 21 are provided with a little temperature gradient, and consequently the wavelengths of the light beams emitted from the four wavelength conversion elements 21 are different from each other. Since the coherency of the light beams can be reduced in this manner, the speckle noise can be reduced.

It should be noted that it is possible that all of the output wavelengths of the emitters 11*a* are equal to each other. As described above, in this configuration, it is only required to control the temperature of the wavelength conversion elements 21 so that the pitch of the periodic polarization inversion structure of at least one of the four wavelength conversion elements 21 becomes different from the pitch of the periodic polarization inversion structure of another of the four wavelength conversion elements 21. Thus, since the wavelengths of the light beams emitted from the wavelength conversion elements 21 can be made different from each other even if all of the output wavelengths of the plurality of emitters 11*a* are equal to each other, the speckle noise can be reduced. In other wards, although the conversion efficiency of the wavelength conversion elements 21 is slightly lowered, reduction of generation of the speckle noise becomes possible. In the case of this configuration, since all of the output wavelengths of the emitters 11*a* of the semiconductor laser element 11 are equal to each other, manufacture of the semiconductor laser element 11 becomes easy.

Although the control section 45 controls the pump 31 based on the difference in the temperature measured by the temperature sensors 42*a*, 42*b*, it is possible to vary the flow rate in accordance with the condition of the speckle noise generated on the light emitted from the light source device 40 to change the temperature of the wavelength conversion element 21.

Third Embodiment

A third embodiment according to the invention will now be explained with reference to FIG. 5.

The light source device 50 according to the present embodiment is different from the first embodiment in that one wavelength conversion element 55 is used correspondingly to one emitter 11*a*. The light source device 50 is the same as the first embodiment in the other configurations.

Figure 5:
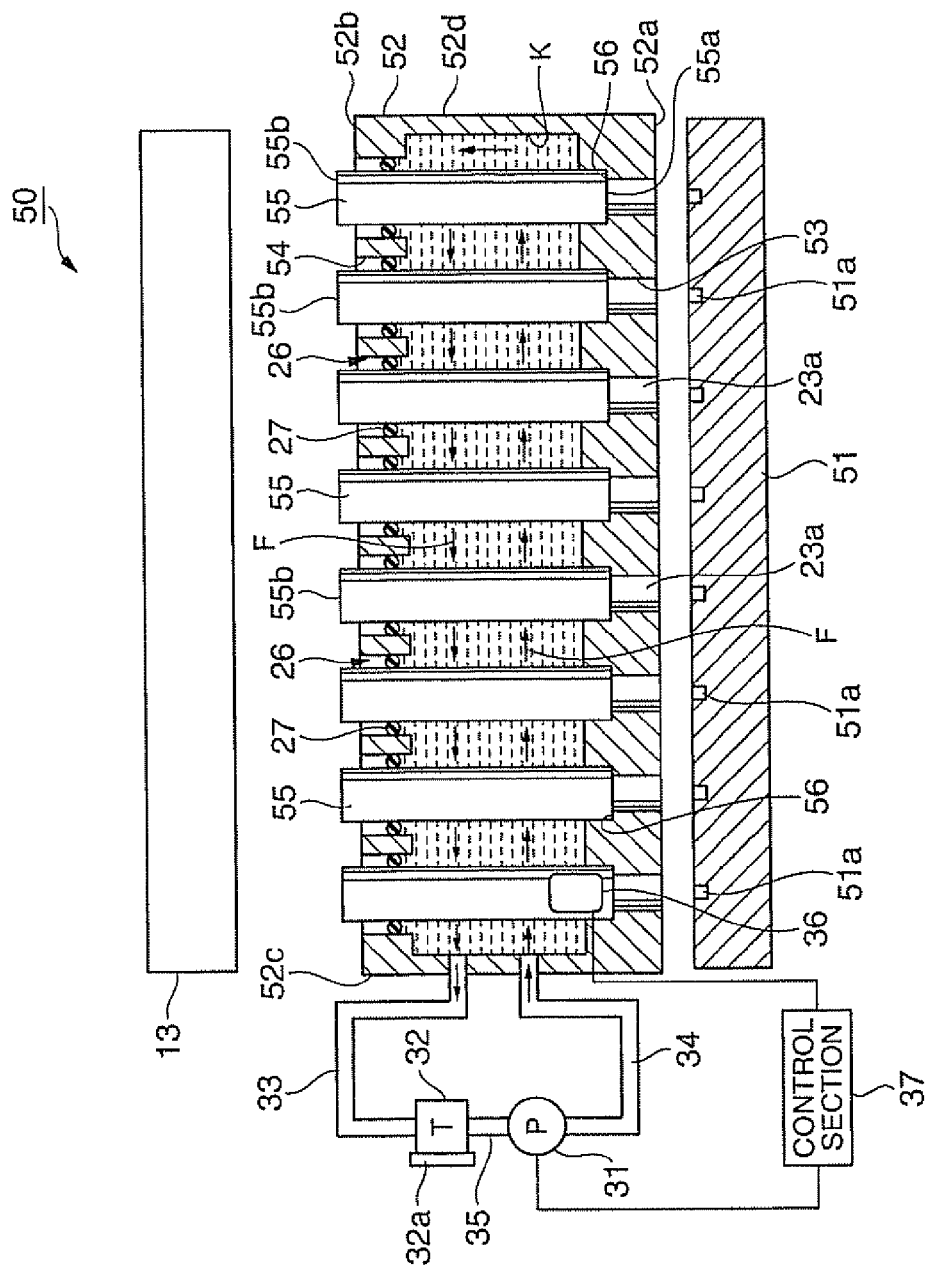
FIG. 5 is a cross-sectional view showing a substantial part of a light source device according to a third embodiment of the invention.

As shown in FIG. 5, the semiconductor laser element 51 is provided with eight emitters 51*a* disposed in a line. Further, the wavelength conversion elements 55 are disposed so as to be opposed respectively to the eight emitters 51*a*. Further, the cross-sectional area of each of the wavelength conversion elements 55 is arranged to have a size in which the spot of the beam emitted from one emitter 51*a* can enter, and to be smaller than the cross-sectional area of the wavelength conversion element 21 of the first embodiment. Thus, the size of the holding member 52 is not so much different from the size of the holding member 22 of the first embodiment although the eight wavelength conversion elements 55, a larger number of wavelength conversion elements than the number of wavelength conversion elements 21 of the first embodiment, are used in the holding member 52 of the present embodiment.

As shown in FIG. 5, the holding member 52 has a cuboid shape and provided with a housing space K inside thereof. Further, the holding member 52 is provided with eight entrance side through holes 53 formed along the end surface 52*a* on the side on which the semiconductor laser element 51 is disposed, and penetrating from the end surface 52*a* towards the housing space K, and eight exit side through holes 54 formed along the end surface 52*b* on the opposite side of the end surface 52*a* and penetrating from the end surface 52*b* towards the housing space K. Further, similarly to the first embodiment, the wavelength conversion elements 55 are positioned in the growth axis direction by the step 56.

Further, the left end section 52*c* of the holding member 52 is provided with the pump 31, the reservoir tank 32, the pipings 33, 34, 35, and the control section 37, and the temperature sensor 36 is provided to the wavelength conversion element 55 disposed on the side of the left end section 52*c* of the holding member 52.

Also in the present embodiment, similarly to the first embodiment, the control section 37 controls the flow rate of the temperature control medium W based on the temperature measured by the temperature sensor 36. Further, as illustrating the flow of the temperature control medium W with the arrow F in FIG. 5, the temperature control medium W flowing in from the side of the entrance end surface 55a of the wavelength conversion element 55 disposed nearest to the left end section 52c proceeds in the arranging direction of the wavelength conversion elements 55 along the side of the entrance end surface 55a of the wavelength conversion element 55, and then proceeds from the side of the exit end surface 55b of the wavelength conversion element 55 disposed nearest to the right end section 52d towards the side of the exit end surface 55b of the wavelength conversion element 55 disposed nearest to the left end section 52c. In this manner, the temperature of the eight wavelength conversion elements 55 is kept constant.

The present embodiment is particularly effective in the case in which the output wavelengths emitted from the eight emitters 51a are different. Specifically, the emitters 51a having the variation in output wavelength of, for example, 1 nm are provided. Further, the element for converting the light beam emitted from the emitter 51a into the light beam with a predetermined wavelength is used as each of the wavelength conversion elements 55 respectively corresponding to the emitters 51a. Thus, since the wavelengths of the light beams emitted from the respective wavelength conversion elements 55 are different, the coherency of the light beam emitted from the light source device 50 can be suppressed.

In the light source device 50 according to the present embodiment, since one wavelength conversion element 55 corresponds to one emitter 51a, it is enough to achieve phase matching of the wavelength conversion element 55 with the wavelength of the light beam from the corresponding emitter 51a in a one-to-one manner, thus the conversion efficiency of the wavelength conversion element 55 can be raised to a maximum extent.

It should be noted that in the case in which the output wavelengths of the light beams emitted from the emitters 51a are different from each other, although it is possible to use the wavelength conversion elements 55 having the pitches of the periodic polarization inversion structures respectively corresponding to the output wavelengths, it is also possible to accommodate the emitters 51a having the output wavelengths within a certain range with one kind of the pitch of the periodic polarization inversion structure. Since the number of wavelength conversion elements with the different pitches of the periodic polarization inversion structures from each other can be reduced in this manner, the manufacturing cost can further be reduced.

Fourth Embodiment

A fourth embodiment according to the invention will now be explained with reference to FIG. 6.

The light source device 60 according to the present embodiment is different from the first embodiment in that one wavelength conversion element 21 is held in one housing space K1. In other words, instead of externally providing the temperature control section, in the present embodiment, the temperature control section is provided inside the housing space, thus the wavelength conversion elements 21 are controlled separately. The light source device 60 is the same as the first embodiment in the other configurations.

The holding member 61 is provided with partition walls 62 formed between the adjacent wavelength conversion elements 21. Thus, the holding member 61 is provided with the four housing spaces K1 each having a roughly cylindrical shape, and the four wavelength conversion elements 21 are each dipped in the temperature control medium W filling the respective housing spaces K1.

Further, the temperature control section 65 is provided with heaters (temperature varying sections) 66 each disposed on a bottom surface 63 on the side of the entrance end surface 21a of the wavelength conversion element 21, and motors (flow sections) 67 each disposed on a side surface 64. Thus, the temperature control medium W in each of the housing spaces K1 is heated by the heater 66 and agitated by the motor 67 separately. In this manner, the temperature of the wavelength conversion elements 21 in the housing spaces K1 is kept equal.

Further, although the pitches of the periodic polarization inversion structures of the wavelength conversion elements 21 are made different from each other as the method of the phase matching in the first embodiment, in the present embodiment, the temperature is made different in the respective wavelength conversion elements 21 similarly to the second embodiment. Therefore, the pitches of the periodic polarization inversion structures of the four wavelength conversion elements 21 are the same. In other words, since the semiconductor laser element 11 has the same configuration as in the first embodiment, the phase matching of each of the wavelength conversion elements 21 with the corresponding emitter group 11b is not achieved. Therefore, it is arranged to achieve phase matching by controlling the temperature of the wavelength conversion element 21 to be a predetermined value to obtain a predetermined pitch.

In the light source device 60 according to the present embodiment, since the housing spaces K1 are provided correspondingly to the respective wavelength conversion elements 21, the temperature of the wavelength conversion element 21 can separately be controlled, and consequently, it becomes easy to control the temperature of the wavelength conversion element 21 so that the pitch of the periodic polarization inversion structure of the wavelength conversion element 21 becomes a predetermined pitch.

Further, the temperature gradient in the wavelength conversion elements 21 is smaller than in the case in which the temperature control is performed using heat conduction by making a holding member made of a solid material with high heat conductivity have contact with a part of the wavelength conversion element 21, and therefore, it becomes possible to perform the temperature control of the wavelength element 21 with accuracy.

It should be noted that the wavelengths of the light beams emitted from the semiconductor laser elements 11 are not particularly limited, and it is enough for the temperature control section 65 to control the temperature of the wavelength conversion elements 21 so that the wavelength of the light beam emitted from at least one wavelength conversion element 21 out of the wavelengths of the light beams emitted form the plurality of wavelength conversion elements 21 is different from the wavelengths of the light beams emitted from the rest of the wavelength conversion elements 21.

Further, the temperature control section 65 is provided with the temperature sensors in the respective housing spaces K1. Still further, by controlling each of the heaters 66 based on the temperature measured by each of the temperature sensors, it becomes possible to more accurately control the temperature of the wavelength conversion elements 21. Further, it is possible that the temperature control section 65 controls the rotational speed of each of the motors 67 based on the temperature measured by the temperature sensors to control the flow rate of the temperature control medium W in each of the housing spaces K1.

Still further, although the motors 67 can be eliminated, in order for controlling the temperature to be more uniform in the wavelength conversion element 21, it is more effective to provide the motors 67. Further, the heaters 66 and the motors 67 can be disposed outside the holding member 61.

Still further, although the temperature is controlled by heating the wavelength conversion element 21 using the heater 66, the member for cooling the temperature control medium W can also be used as the temperature varying section. Specifically, it is also possible to provide a radiator fin shape to the holding member 61 for radiating heat.

Modified Example of Fourth Embodiment

Figure 6:
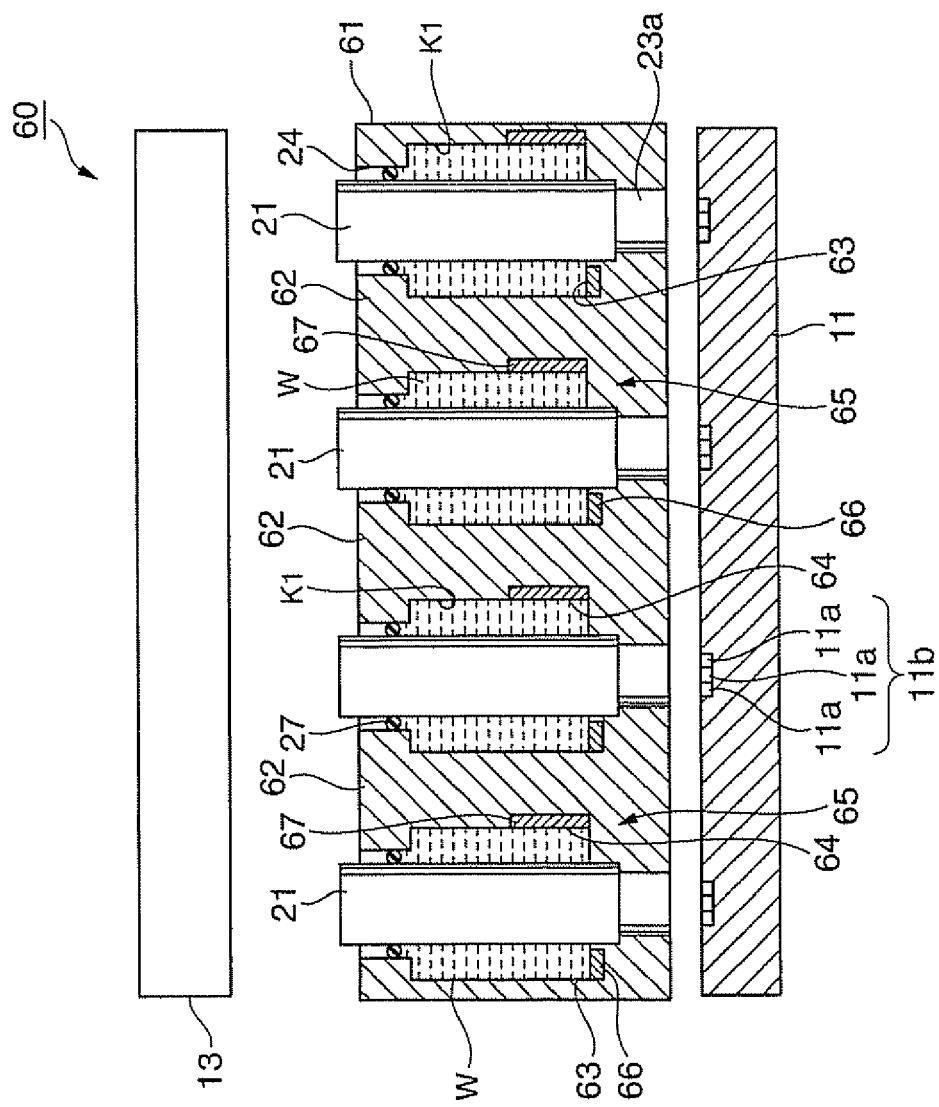
FIG. 6 is a cross-sectional view showing a substantial part of a light source device according to a fourth embodiment of the invention.
Figure 7:
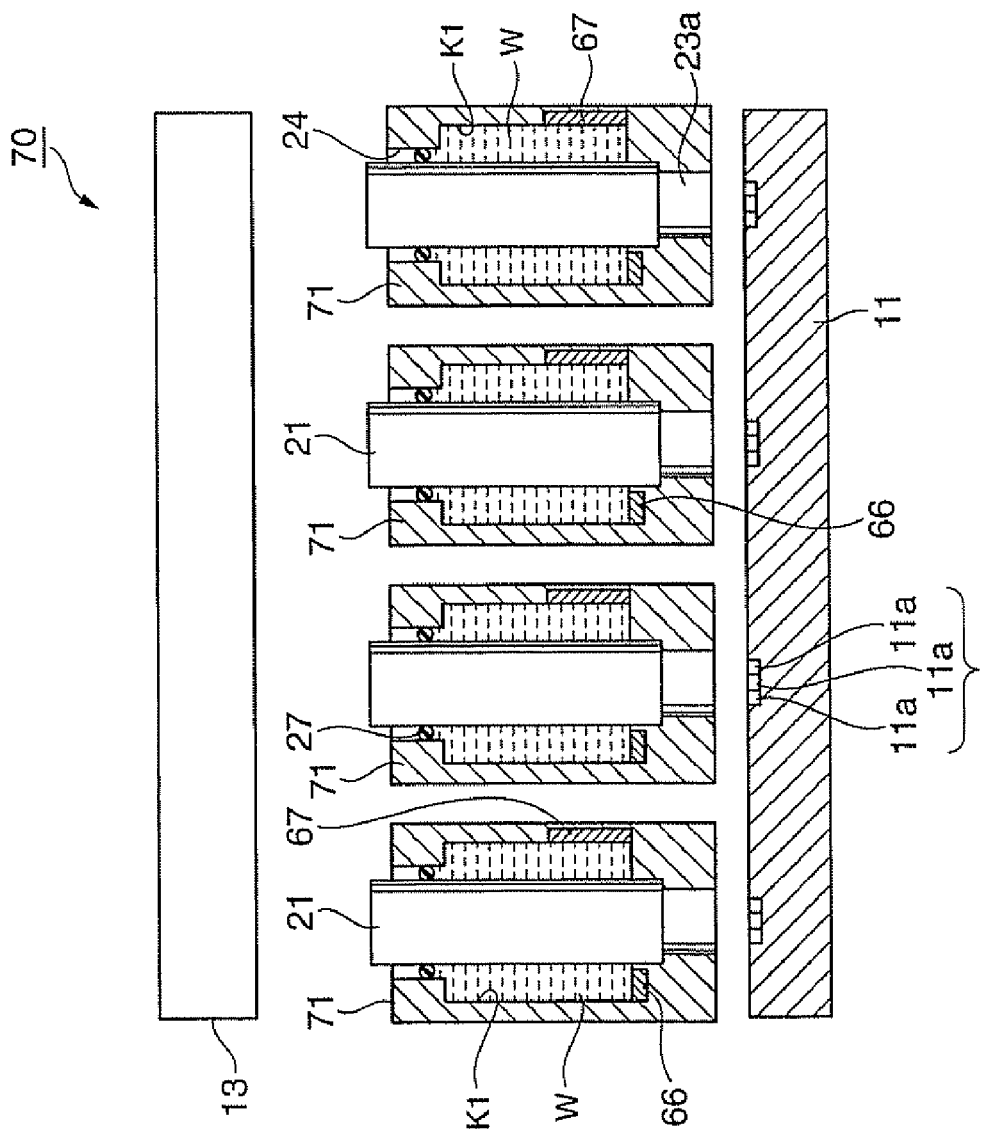
FIG. 7 is a cross-sectional view showing a substantial part of a light source device according to a modified example of the fourth embodiment of the invention.

The light source device 70 of a modified example of the fourth embodiment shown in FIG. 7 has a configuration of dividing the holding member 61 of the fourth embodiment shown in FIG. 6 at the partition walls 62. Specifically, a holding member 71 is provided for every wavelength conversion element 21 to hold each of the wavelength conversion elements 21. Further, the holding members 71 are disposed so as to be opposed to the respective emitter groups 11b with a predetermined distance.

Thus, since the temperature of the wavelength conversion element 21 can be controlled individually, and the heat conduction between the holding members 71 respectively holding the adjacent wavelength conversion elements 21 becomes difficult, it becomes possible to perform more accurate temperature control for every wavelength conversion element 21.

It should be noted that there can be adopted a configuration of forming a heat insulating member between the adjacent holding members 71 to reduce the heat conduction between the wavelength conversion elements 21 adjacent to each other.

Fifth Embodiment

A fifth embodiment according to the invention will now be explained with reference to FIG. 8.

Figure 8:
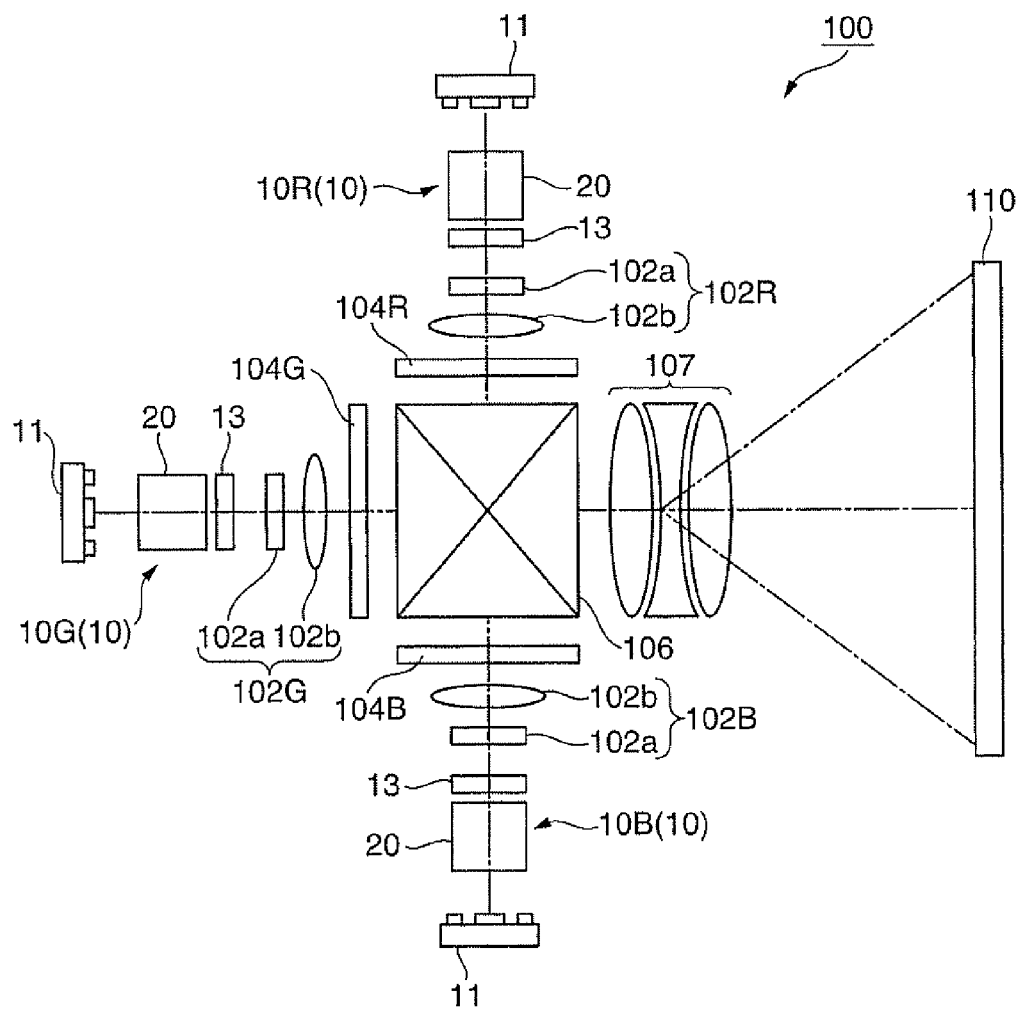
FIG. 8 is a light path diagram showing a projector according to a fifth embodiment of the invention.

It should be noted that in FIG. 8, a chassis forming a projector 100 is omitted for the sake of simplification.

In the projector 100, a red laser beam source (a light source device) 10R, a green laser beam source (a light source device) 10G, and a blue laser beam source (a light source device) 10B for respectively emitting a red light beam, a green light beam, and a blue light beam are each the light source device 10 of the first embodiment described above.

Further, the projector 100 is provided with an image forming device including liquid crystal light valves (light modulation devices) 104R, 104G, 104B for respectively modulating the laser beams emitted from the laser beam sources 10R, 10G, 10B, and a projection lens (a projection device) 107 for enlargedly projecting an image formed by the liquid crystal light valves 104R, 104G, 104B on a screen (a display surface) 110. Further, the projector 100 is provided with a cross dichroic prism (a colored light composition section) 106 for combining the light beams emitted from the liquid crystal light valves 104R, 104G, and 104B and leading the combined light beams to a projection lens 107.

Further, in order for equalizing the illumination distribution of the laser beams emitted from the laser beam sources 10R, 10G, 10B, the projector 100 is provided with equalizing optical systems 102R, 102G, 102B disposed downstream of the laser beam sources 10R, 10G, 10B along the optical paths, respectively, and illuminates the liquid crystal light valves 104R, 104G, 104B with the light beams having the illumination distribution equalized the equalizing optical systems 102R, 102G, 102B. For example, the equalizing optical systems 102R, 102G, 102B are each composed, for example, of a hologram 102a and a field lens 102b.

The three colored light beams modulated by the respective liquid crystal light valves 104R, 104G, and 104B enter the cross dichroic prism 106. The prism is formed by bonding four rectangular prisms, and is provided with a dielectric multilayer film for reflecting red light beam and a dielectric multilayer film for reflecting blue light beam disposed on the inside surfaces forming a crisscross. The three colored light beams are combined by these dielectric multilayer films to form a light beam for representing a color image. Further, the light beam obtained by combining the three colored light beams is projected on the screen 110 by the projection lens 107, thus an enlarged image is displayed.

Since the red laser beam source 10R, the green laser beam source 10G, and the blue laser beam source 10B can suppress the speckle noise, the projector 100 of the present embodiment described above is capable of displaying a clear image with reduced dazzle at low cost.

It should be noted that although the case in which the wavelength conversion element unit 20 of the first embodiment is used in the red, green, and blue laser beam sources 10R, 10G, 10B is explained in the projector of the present embodiment, it is also possible to use the light source devices of the first through fourth embodiments (including the modified example). On this occasion, it is possible to adopt the light source device having a different wavelength conversion element unit to each of the light source devices 10, or to adopt the light source device having the same wavelength conversion element unit thereto.

Further, the configuration of the groups with different average wavelengths can cope not only with the configuration of slightly shifting the wavelength within a range of the same color, but also, therefore, with such a large difference in wavelength as to configure three colors of R, G, and B. For example, the configuration of nine blocks composed of three colors each including three blocks (the wavelengths of the three blocks in the same color are slightly shifted from each other) can also be adopted.

Further, although the transmissive liquid crystal light valves are used as the light modulation devices, light valves other than the liquid crystal type can also be used, or reflective light valves can also be used. As such a light valve, a reflective liquid crystal light valve, a digital micromirror device, and so on can be cited. The configuration of the projection optical system is appropriately modified in accordance with the type of the light valves used therein.

Further, it is possible to apply the light source devices of the first through fourth embodiments (including the modified example) to the light source device of a scanning image display device (a projector) having a scanning section, which is an image forming device for displaying an image of a desired size on a display surface by scanning a laser beam from a laser beam source (a light source device) on a screen.

It should be noted that the scope of the invention is not limited to the embodiments described above, but various modifications can be executed thereon within the scope or the spirit of the invention.

For example, although the cross dichroic prism is used as the colored light composition section, the colored light composition section is not limited thereto. As the colored light composition section, what has dichroic mirrors in a cross arrangement to combine the colored light beams, or what has dichroic mirrors arranged in parallel to each other to combine the colored light beams, and so on can be used.

The entire disclosure of Japanese Patent Application No. 2007-155317, filed Jun. 12, 2007 is expressly incorporated by reference herein.

What is claimed is:

1. A light source device comprising:
    a light source having a plurality of light emitting sections;
    a plurality of wavelength conversion elements each having a periodic polarization inversion structure, and for converting wavelengths of light beams emitted from the plurality of light emitting sections into predetermined wavelengths;
    a temperature control medium for controlling temperature of the plurality of wavelength conversion elements;
    a holding member having a housing space for housing the temperature control medium, and for holding the plurality of wavelength conversion elements; and
    a temperature control section for controlling the temperature of the plurality of wavelength conversion elements with the temperature control medium,
    wherein the temperature control section controls the temperature of the wavelength conversion elements so that the wavelength of the light beam emitted from at least one of the plurality of wavelength conversion elements is different from the wavelength of the light beam emitted from another of the plurality of wavelength conversion elements.

2. The light source device according to claim 1,
    wherein a pitch of the periodic polarization inversion structure of at least one of the plurality of wavelength conversion elements is different from a pitch of the periodic polarization inversion structure of another of the plurality of wavelength conversion elements, and
    the temperature control section controls the temperature of the plurality of wavelength conversion elements to be substantially the same.

3. The light source device according to claim 1,
    wherein pitches of the periodic polarization inversion structures of the plurality of wavelength conversion elements are substantially equal to each other, and
    the temperature control section controls the temperature of the wavelength conversion elements so that the temperature of at least one of the plurality of wavelength conversion elements is different from the temperature of another of the plurality of wavelength conversion elements.

4. The light source device according to claim 1,
    wherein a circulating channel for circulating the temperature control medium in the housing space is disposed outside the holding member, and
    the temperature control medium flows along an arranging direction of the plurality of wavelength conversion elements.

5. The light source device according to claim 4,
    wherein an inflow section allowing the temperature control medium to flow into the housing space and an outflow section allowing the temperature control medium to flow out from the housing space are provided to one end section of the holding member in the arranging direction of the plurality of wavelength conversion elements, and
    the inflow section and the outflow section are communicated to each other with the circulating channel.

6. The light source device according to claim 5,
    wherein the inflow section is disposed nearer to the side of an entrance end surface of the wavelength conversion element than the outflow section.

7. The light source device according to claim 4,
    wherein an inflow section allowing the temperature control medium to flow into the housing space is provided to one end section of the holding member in the arranging direction of the plurality of wavelength conversion elements,
    an outflow section allowing the temperature control medium to flow out from the housing space is provided to the other end section of the holding member in the arranging direction of the plurality of wavelength conversion elements, and
    the inflow section and the outflow section are communicated to each other with the circulating channel.

8. The light source device according to claim 1, further comprising
    a temperature measuring section for measuring the temperature of at least one of the wavelength conversion elements,
    wherein the temperature control section varies a flow rate of the temperature control medium based on the temperature measured by the temperature measuring section.

9. The light source device according to claim 1,
    wherein the housing space is provided for every one of the plurality of wavelength conversion elements.

10. The light source device according to claim 9,
    wherein the holding member is provided for every one of the plurality of wavelength conversion elements.

11. The light source device according to claim 1,
    wherein the temperature control section includes a temperature varying section for varying the temperature of the wavelength conversion element via the temperature control medium, and a flow section for making the temperature control medium flow, and
    the temperature varying section and the flow section are provided separately from the holding member.

12. The light source device according to claim 1,
    wherein the temperature control section includes
        a temperature varying section for varying the temperature of the wavelength conversion element via the temperature control medium, and
        a flow section for making the temperature control medium flow, and
    the temperature varying section and the flow section are provided to the holding member.

13. The light source device according to claim 1,
    wherein the holding member is provided with a positioning section for positioning the wavelength conversion element in a proceeding direction of the light beam.

14. The light source device according to claim 1,
    wherein the wavelength conversion element has a growth striation caused by a periodic variation in one of crystal composition and impurity concentration, and the growth striation forms the periodic polarization inversion structure.

15. A projector comprising:
    the light source device according to claim 1; and
    an image forming device using the light beam from the light source device to display an image of a desired size on a display surface.

* * * * *